(12) United States Patent
Bertelsen

(10) Patent No.: US 7,883,321 B2
(45) Date of Patent: Feb. 8, 2011

(54) WIND TURBINE ROTOR BLADE AND METHOD OF MANUFACTURING SUCH ROTOR BLADE

(75) Inventor: Kim Bertelsen, Ulfborg (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/527,668

(22) PCT Filed: Feb. 19, 2008

(86) PCT No.: PCT/DK2008/050042

§ 371 (c)(1),
(2), (4) Date: Dec. 29, 2009

(87) PCT Pub. No.: WO2008/101506

PCT Pub. Date: Aug. 28, 2008

(65) Prior Publication Data

US 2010/0090472 A1    Apr. 15, 2010

(30) Foreign Application Priority Data

Feb. 19, 2007    (DK) ............................... 2007 00258

(51) Int. Cl.
*F03D 11/00*        (2006.01)
(52) U.S. Cl. ................................. 416/146 R; 416/230

(58) Field of Classification Search ....................... None
See application file for complete search history.

(56) References Cited

U.S. PATENT DOCUMENTS

2006/0280613 A1*  12/2006  Hansen ....................... 416/230

FOREIGN PATENT DOCUMENTS

| EP | 0580417 | 7/1993 |
| WO | WO 03/008800 | 1/2003 |
| WO | WO 2005/026538 | 3/2005 |
| WO | WO 2005/050808 | 6/2005 |

* cited by examiner

*Primary Examiner*—Richard Edgar
(74) *Attorney, Agent, or Firm*—Cohen Pontani Lieberman & Pavane LLP

(57) ABSTRACT

The invention relates to a wind turbine rotor blade comprising a blade tip and a lightning protection system. The blade includes at least one metallic lightning receptor at the surface of the blade in proximity of the distal end of the blade tip. The blade comprises a blade shell configured partly by a fibre-reinforced laminate, and the blade also comprises an electrically down-conducting element in the form of a metallic mesh. The electrically down-conducting element extends only to a certain distance from the distal end of the tip of the blade, said distance being larger than a distance between the position of the lightning receptor and the distal end of the tip of the blade. It is hereby ensured that a stroke of lightning will strike the receptor more likely than the electrically down-conducting element.

17 Claims, 3 Drawing Sheets

US 7,883,321 B2

WIND TURBINE ROTOR BLADE AND METHOD OF MANUFACTURING SUCH ROTOR BLADE

PRIORITY CLAIM

This is a U.S. national stage of application No. PCT/DK2008/050042, filed on Feb. 19, 2008. Priority is claimed on the following application: Country: Denmark, Application No.: PA200700258, Filed: Feb. 19, 2007, the content of which is incorporated here by reference.

FIELD OF THE INVENTION

The invention relates to a wind turbine rotor blade comprising a blade tip and a lightning protection system, said blade including at least one metallic lightning receptor at the surface of the blade in proximity of the distal end of the blade tip, and said blade possibly including a lightning receptor base within the surface of the blade, and said blade comprising a blade shell configured partly by a fibre-reinforced laminate, said blade comprising an electrically down-conducting element in the form of a metallic mesh.

The invention also relates to a method of manufacturing a wind turbine rotor blade with a system for lightning protection of the tip of the blade, the method comprising the step of manufacturing a blade body comprising a fibre-reinforced polymer, preferably a carbon-fibre-reinforced polymer, and the method comprising the further step of applying, on the surface of the blade or embedded in the surface of the blade, an electrically down-conducting element in the form of a metallic mesh.

BACKGROUND OF THE INVENTION

Problems are observed by strokes of lightning striking wind turbine rotor blade tips. Different know solutions to the problem are known. Common to the solutions is the risk of de-lamination or incineration of the surface composite material and/or heating and melting of metallic components. There is also the risk that shock waves, caused by internal arcs, may explode the blades, ripping the blade surface shells apart along the edges and from the internal carrying spar.

WO2005/026538 describes a method of lightning-proofing a blade on a wind-energy plant. The blade comprises a blade shell configured essentially as a fibre-reinforced laminate, which laminate comprises electrically conductive fibres. The blade comprises at least one lightning arrester configured for conducting lightning current, including preferably to ground. The electrically conductive fibres are connected to each other, and that at least one metallic receptor is arranged for capturing lightning current at or in proximity of the external face of the blade. The receptor and the fibres are connected to the lightning arrester for equalising the difference in potential between the lightning arrester and the electrically conductive fibres.

The document discloses that when the electrically conductive fibres are connected to each other, the fibres will cooperate on the conduction of a possible lightning current to prevent the current from running in individual fibres. The metallic receptor will simultaneously serve as the primary lightning capturing device and reduce the risk of lightning striking the laminate. The receptor being connected to the lightning arrester, the current will be conducted to ground, while the risk of transfer to the laminate is minimised in that a possible difference in potential between fibres and lightning arrester has been equalised. The document does not address the specific problems at the tip of the blade.

SUMMARY OF THE INVENTION

It may be seen as an object of the present invention to provide a wind turbine rotor blade having incorporated electrical conductivity means and still being able to divert strokes of lightning without the electrical conductivity means and/or the tip of the blade being damaged by the stroke of lightning.

It may also be seen as an object of the present invention to provide a method of manufacturing a wind turbine rotor blade, the tip of said wind turbine rotor blade at least being manufactured by materials being electrically non-conductive, or at least having a relatively high dielectric strength.

The firstly mentioned object of the invention is obtained by a wind turbine rotor blade, where
    said at least one metallic lightning receptor at the surface of the blade is positioned in a first distance from the distal end of the blade tip, and
    said metallic mesh is extending along a longitudinal axis of the blade from a second distance from the distal end of the tip of the blade and towards a root end of the blade, said second distance being larger than said first distance.

Having the electrically down-conducting element extending to a certain second distance from the distal end of the tip of the blade, and having the at least one lighting receptor positioned in a first distance from the distal end of the tip of the blade, and where the first distance is smaller than the second distance, the lightning receptor and the electrically down-conducting element are physically divided, i.e. there is no direct electrical contact between the lightning receptor and the down-conducting element.

The provision of the electrically down-conducting element extending only to a certain distance from the distal end of the tip of the blade ensures that a stroke of lightning will be more likely to strike the receptor rather than the electrically down-conducting element.

Providing an electrical conductor between the metallic lighting receptor and the electrically down-conducting element, an electrical contact is nevertheless obtained between the metallic lighting receptor and the electrically down-conducting element. Thus, the electrical charge induced when a stroke of lightning hits the at least one metallic lighting receptor, is guided along the electrical conductor to the electrically down-conducting element, and further on to the ground.

The advantage obtained is the possibility of highly reducing the risk of the electrically down-conducting element being damaged during a stroke of lightning despite the use of metallic fibres and/or carbon fibres when manufacturing the blade.

According to a preferred embodiment, said at least one metallic lightning receptor is supported in the surface of the blade, and said lightning receptor is embedded in a dielectric washer, said dielectric washer being embedded in the surface of the blade, and said dielectric washer at least partly circumscribing the lightning receptor along the surface of the blade.

Preferably, a dielectric strength of the dielectric washer is larger than 10,000,000 Volts/meter, possibly in the range from 20,000,000 Volts/meter to 80.000.000 Volts/meter.

A dielectric washer in which the at least one lightning conductor is embedded and the dielectric washer at least partly circumscribing the lightning receptor along the surface of the blade results in the lightning receptor further being electrically insulated from the rest of the blade. Thereby, the probability is highly increased that a stroke of lightning will strike the lightning receptor and not the electrically down-conducting element or perhaps the electrical conductor extending between the lighting receptor and the electrically down-conducting element.

In one embodiment, the dielectric washer is fully circumscribing the lightning receptor, at least in the surface of the blade. This results in the electrical insulation of the lighting receptor being accomplished in every direction from the lightning receptor. Thus, any stroke of lightning in the lightning receptor will be prevented from travelling along the surface of the blade, and will be forced to travel along the electrical conductor to the electrically down-conducting element.

In one embodiment, the dielectric washer is only partly circumscribing the lightning receptor, at least in the surface of the blade. This results in the electrical insulation of the lighting receptor being accomplished in a selected direction from the lightning receptor. Thus, any stroke of lightning in the lightning receptor will be prevented from travelling along the surface of the blade, at least in the selected direction, where the dielectric washer is circumscribing the lightning receptor, and will be forced to travel along the electrical conductor to the electrically down-conducting element.

The selected direction will preferably be the direction along which the electrical conductor is extending from the lightning receptor to the electrically down-conducting element.

The lightning receptor may be having a length extending from the surface of the blade and towards a central part of the blade, and said dielectric washer having a length extending from the surface of the blade and towards the central part of the blade, said length of the lightning receptor being larger than said length of the dielectric washer. At least a part of the electrical conductor is placed below a lower surface of the dielectric washer, and the lightning receptor is connected to the electrical conductor, in order to force a stroke of lightning to travel from the lightning receptor to the electrical conductor.

It is most likely only along the surface of the blade, and not inside the blade as such, that a risk exists of the stroke of lightning striking other parts of the blade than the lightning receptor, or that the stroke of lightning, after having struck the lightning receptor, will tend to travel in other directions than the intended direction along the electrical conductor. Therefore, the dielectric washer need not extend all the way through the blade, but need only extend a minor distance into the blade, as long as the surface is covered.

A dielectric washer having a length which is reduced compared to the length of the lightning receptor will have as little effect as possible on the mechanical integrity of the tip of the blade.

The dielectric washer is preferably made of plastic, preferably a plastic resin, more preferred a fibre-reinforced plastic resin, all of which are materials having a high dielectric strength.

Different cross-sections may be used when designing the lightning receptor and the dielectric washer. Thus, the cross-section of the lightning receptor has an outer circumference being circular, and the cross-section of the dielectric washer has an inner circumference corresponding to the outer circumference of the first cross-sectional area, i.e. being circular.

The cross-section of the lightning receptor may be disc-shaped and the cross-section of the dielectric washer will be annular, having an inner circumference preferably corresponding to the outer circumference of the lighting receptor and having the dielectric washer circumscribing the lightning receptor in immediate vicinity of the lightning receptor.

The electrical conductor may be constituted by a piece of metallic plate, said metallic plate having a first width in the surface of the blade along a section arranged proximate to the blade tip and at the location of the lightning receptor, and said metallic plate having a second width in the surface of the blade along a section arranged distant from the blade tip and at the position of the electrically down-conducting element, and said first width of the proximate section of the metallic plate being smaller than the second width of the distant section of the metallic plate.

The section of the metallic plate being in contact with the lightning receptor, or possibly being in contact with a lightning receptor base onto which the lightning receptor is mounted, will have a limited width, so that the risk of the lightning striking the metallic plate is limited compared to the possibility of the lightning striking the lightning receptor.

On the other hand, the section of the metallic plate being in contact with the electrically down-conducting element will have an enlarged width, so that the electrical current is spread out to as large a surface of the electrically down-conducting element as possible.

If the blade is provided with a lightning receptor dielectric washer, a preliminary part of said first section of the metallic plate may extend from the lightning receptor and towards the distant section on a lower surface of the dielectric washer in relation to the surface of the blade, and a remaining part of the metallic plate extending on the surface of the blade towards the distant section of the metallic plate at a position of the electrically down-conducting element.

A preliminary part of the electrical conductor running below a lower surface of the dielectric washer, i.e. running at a certain embedded distance inside the structure of the blade and not running at the surface of the blade, results in the risk of the lightning striking the metallic plate being limited compared to the possibility of the lightning striking the lightning receptor.

In a preferred embodiment of a wind turbine rotor blade, at least one first lightning receptor is provided in one surface of the blade, and at least one second lightning receptor is provided in another opposite surface of the blade, said first lightning receptor and said second lightning receptor each being electrically communicating with an electrical conductor, one electrical conductor extending along the one surface of the blade and another electrical conductor extending along the other opposite surface of the blade. At least one lightning receptor is provided on each surface of the blade, and each of the lightning receptors electrically communicating with individual electrical conductors on each surface of the blade has the advantage that it will be unnecessary to have a common conductor extending in the cavity of the blade. Manufacture of the blade will consequently be simplified.

The first lightning receptor and the second lightning receptor may possibly have a mutual electrical coupling, the first lightning receptor and the second lightning receptor each electrically communicating with both the one and the other electrical conductor along the mutual electrical coupling.

Lightning receptors being provided in each surface of the blade and being electrically coupled result in the stroke of lightning being capable of striking either the one surface of the blade or the other surface of the blade, but still utilising the entire electrical conductivity of both the lightning receptor being struck, and the lightning receptor not being struck. But also both the electrical conductors will be utilised, i.e. both the one on the surface of the blade being struck and the one on the surface of the blade not being struck.

In a possible and preferred embodiment, the wind turbine rotor blade is at least in part constituted by a wooden material, said blade at least in part also being constituted by carbon fibres, and at least one fibre mesh of a metallic material is incorporated into the blade, preferably at the surface of the blade or just beneath the surface of the blade.

The use of wooden material in the blade has advantages with respect to manufacture of blades, but has disadvantages with respect to lightning protection. Wooden material in itself is not electrically conducting. Therefore, although possibly reinforced by carbon fibres, additional features must be incorporated into the blades. One possible feature is the addition of a fibre mesh of a metallic material. Thereby, the mechanical integrity of the blade may be enhanced, but primarily a means is obtained for conducting electrical current from a stroke of lightning along the longitudinal extension of the blade towards the root of the blade.

However, due to the fact that the fibre-mesh is often destroyed if directly hit by a stroke of lightning, the use of a fibre mesh must be considered bearing that risk in mind.

The secondly mentioned object of the invention is obtained by a method for manufacturing a wind turbine rotor blade, said method comprising the steps of providing a blade configured partly by a fibre-reinforced laminate providing a lightning protection system including at least one metallic lightning receptor at a surface of the blade, said at least one metallic lightning receptor being positioned proximate to the distal end of the blade tip, providing at least one electrically down-conducting element in the form of a metallic mesh, and providing at least one electrical conductor for conducting an electrical current induced in the at least one metallic lightning receptor during a stroke of lightning, from the at least one metallic lightning receptor to the metallic mesh, and positioning said at least one metallic lightning receptor at the surface of the blade in a first distance from the distal end of the blade tip, and positioning said metallic mesh to extend along a longitudinal axis of the blade from a second distance from the distal end of the tip of the blade and towards a root end of the blade, said second distance being larger than said first distance.

Manufacturing a wind turbine rotor blade according to the above method results in a blade being made essentially of a combination of wooden and carbon fibre reinforced resin. Despite the disadvantages of such blade in respect of being able to cope with a stroke of lightning, the features of the present invention renders such blades fully capable of coping with a stroke of lightning, possibly as well as blades having metallic rod-like conductors extending all the way along the longitudinal extension of the blade.

Preferably, the method comprises the further step of:

applying on the surface of or embedding in the surface of the blade a dielectric washer, said dielectric washer at least partly circumscribing the lightning receptor, and said dielectric washer circumscribing at least an exterior cross-section of the lightning receptor, and said dielectric washer having an extension from the lightning receptor along the surface of the blade providing an electrical insulation between the lightning receptor and the surface of the blade in any direction were the dielectric washer is circumscribing the lightning receptor.

Applying a dielectric washer as the one described above even further renders such blades fully capable of coping with a stroke of lightning, possibly as well as blades having metallic rod-like conductors extending all the way along the longitudinal extension of the blade.

BRIEF DESCRIPTION OF THE FIGURES

In the following, the invention will be descried with reference to the figures, where.

DETAILED DESCRIPTION OF THE INVENTION

Figure 1:
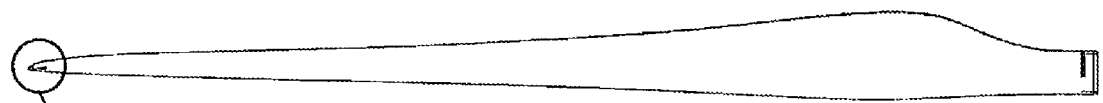
FIG. 1 is a drawing showing a wind turbine rotor blade being provided with a lightning protection system according to the invention being provided at the tip of the blade.
Figure 2:
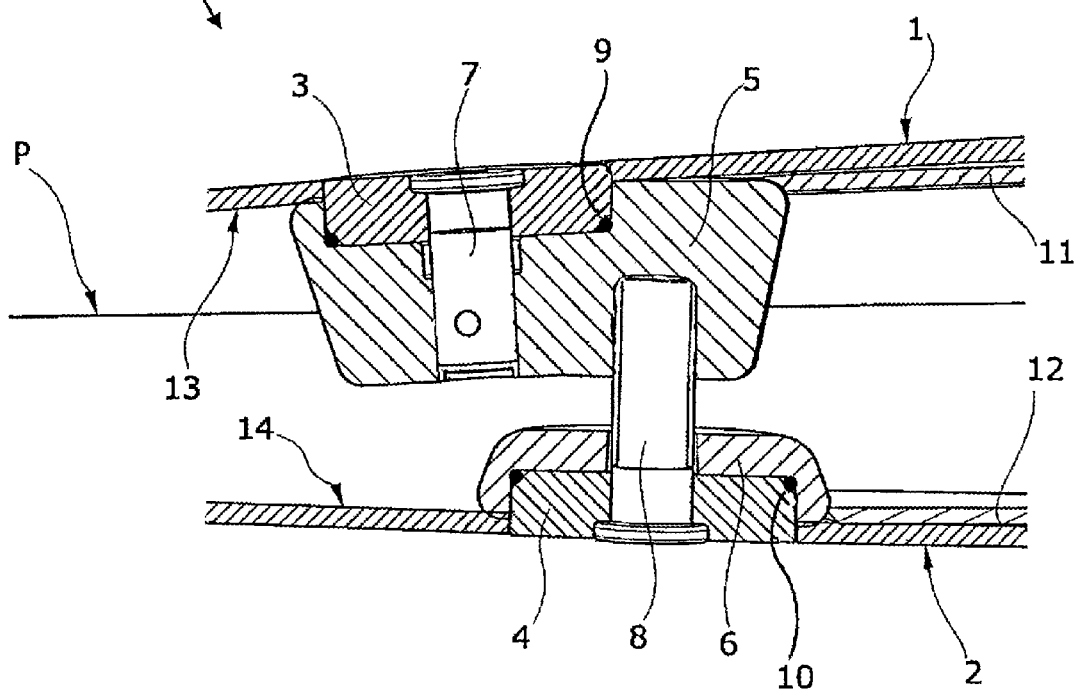
FIG. 2 is a drawing showing a cross-section of the wind turbine rotor blade with the lightning protection system having lightning receptors at the tip of the blade.

FIG. 1 is a plane view of a wind turbine rotor blade amongst other features also being provided in the tip of the blade with a lightning protection system as shown and described with reference to FIGS. 3-4. The blade may have a substantial length, i.e. a length of up to 50 m or even more. Blades having such magnitude may be manufactured by using manufacturing techniques that are alternative to the ones commonly used, e.g. by using wood, carbon fibres or other lightweight elements for obtaining a proper rigidity and strength together with the relative heavyweight resin also constituting part of the blade. Traditional manufacturing methods may also be employed for manufacturing the blade FIG. 2 is a cross-section of a section of the tip of the wind turbine rotor blade, the cross-section being along a plane extending substantially transversely to and parallel with a rotor plane P of the blade. The rotor plane P of the blade is the plane in which the blade performs rotation, when being mounted on the wind turbine and constituting part of the rotor during operation.

The figure illustrates part of a first lee-ward surface 1 of the blade and part of a second wind-ward surface 2 of the blade. The first surface 1 is the exterior surface of the blade facing forwards when the blade is mounted on the wind turbine as part of the rotor during operation, and the second surface 2 of the blade is the exterior surface facing rearwards when the blade is mounted on the wind turbine during operation as part of the rotor during operation.

Within the first surface 1 of the blade and the second surface 2 of the blade a first metallic lightning receptor 3 and a second metallic lightning receptor 4 is provided. The first metallic lightning receptor 2 and the second metallic lightning receptor 4 are kept in place in relation to the surfaces of the blade by means of lightning receptor bases 5,6 situated in the interior cavity of the blade. The lightning protector bases 5,6 are preferably, and obligatorily in the embodiment shown, made of a metallic material.

The lightning receptors 3,4 are each secured to a lightning receptor base 5,6 by bolts 7,8 extending through holes provided in the lightning protectors 3,4. The bolts 7,8 have a bolt head and a thread, said thread cooperating with a corresponding threaded hole (not shown) in the respective lightning protector base 5,6. One bolt 8 of the second lightning receptor base 6 extends through the second lightning receptor 4 and through the second lightning receptor base 6 and is secured to the first lightning receptor base 5. Another bolt 7 of the first lightning receptor base 5 extends through the first lightning receptor 3 and is secured to the first lightning receptor base 5. Thereby, electrical coupling is provided between the first lightning receptor 3 and the second lightning receptor 4.

Humidity-insulating elements 9,10 such as an annular elastomeric ring, e.g. a rubber O-ring, is provided between the lightning receptor 3,4 and the lightning receptor base 6,7.

Electrical conductors 11,12 are welded or in any similar manner electrically connected to the lightning receptor bases 5,6. It is to be noted that the electrical conductors are not the same technical feature as the electrically down-conducting elements, which are described later with reference to FIGS. 3-4.

The electrical conductors 11,12 extend from the lightning receptor bases 5,6 and along the blade, either as shown at the interior side wall 13,14 of the surfaces 1,2 of the blade, alternatively and preferred, within the shell of blade, the shell being the lee-ward and the windward parts of the blade as such. The electrical conductors 11,12 extend along the blade to an electrically down-conducting element (see FIG. 3 and FIG. 4).

Within the cavity between the shells of the blade constituting the lee-ward surface 1 and the wind-ward surface 2 the electric properties are changed. Changing the electric properties within the cavity, at least around the lightning receptor bases, results in the exterior surface of the lightning receptors, and not the lightning receptor bases inside the cavity of the blade, being struck by lightning if a lightning strikes the tip of the blades Electric property should be understood as the resistivity, the conductivity or the dielectric strength of the cavity of blade, at least in the vicinity of the lightning receptor bases.

In an aspect of the invention, an increase in the electric field is supported, during a stroke of lightning, between the lightning receptor bases 5,6 and the inner side walls 13,14 of the blade. When increasing the electrical field being supported during a stroke of lightning, a much larger electrical field is needed in order to initiate a dielectric breakdown inside the rotor blade. The possible ignition of a spark, and thus an increase in pressure, inside the rotor blade can be precluded, and thus damage to the rotor blade tip can be avoided.

Figure 3:
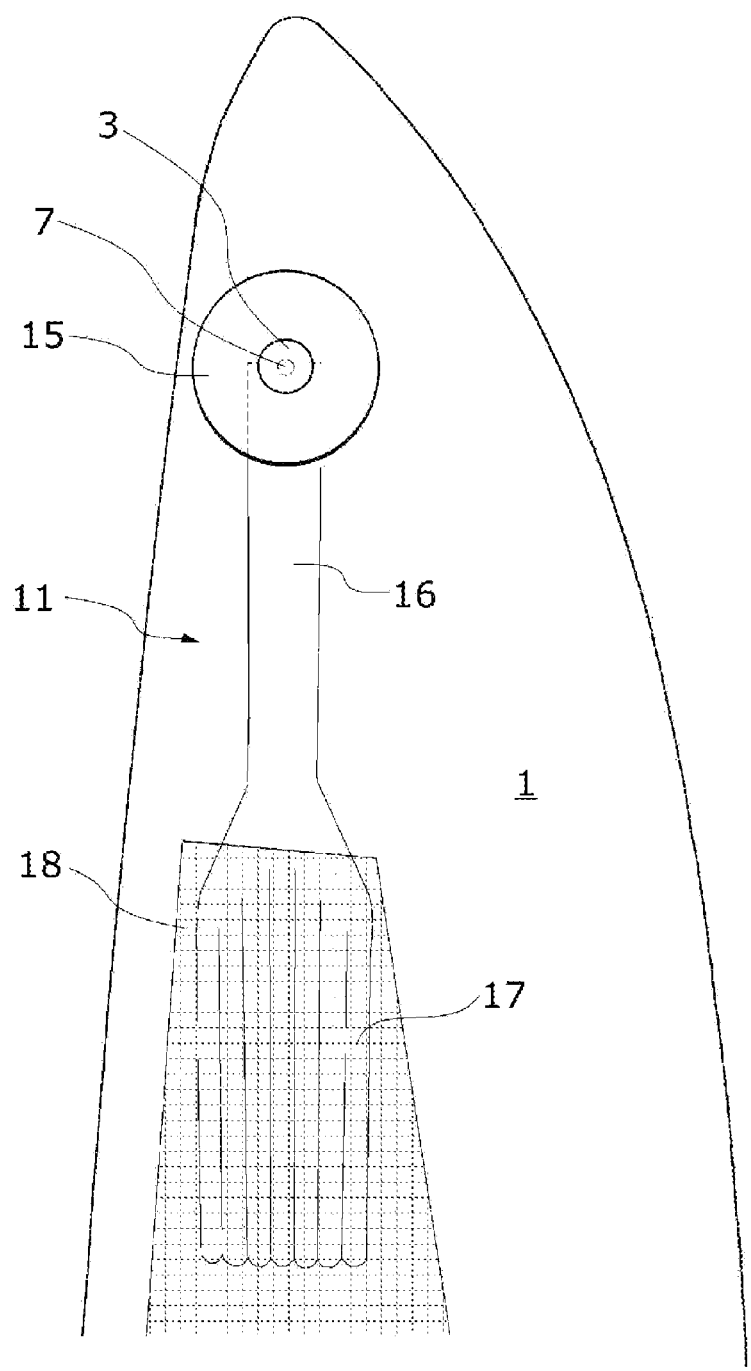
FIG. 3 is a sketch of the first lightning receptor, the dielectric washer and the electrical conductor when mounted in the blade, before a surface layer of the blade is applied.

FIG. 3 is a sketch showing a surface of a blade tip with a lightning protection system according to the invention installed. The surface of the blade is the lee-ward surface 1 when the blade is mounted on the wind turbine and when being in operation.

The first lightning receptor 3 is shown, and the head of the first bolt 7 securing the lightning receptor 3 to the blade is shown. A dielectric washer 15 is shown circumscribing the first lightning receptor 3.

A first section 16 of the electrical conductor is in electrical communication with the first lightning receptor 3 along the first lightning receptor base (see FIG. 2), and a second section 17 of the electrical conductor 11 is in electrical communication with an electrically down-conducting element, which in the embodiment shown is a mesh of metal wires.

Part of the first section 16 of the electrical conductor 11 extends embedded further below the surface of the blade than the rest of the first section, said part being maintained further below the surface of the blade, within the shell of the blade, by means of the dielectric washer 15 circumscribing the first lightning receptor 3.

The remaining part of the electrical conductor 11, i.e. the rest of the first section 16, the intermediate section, and the second section 17 also extend embedded below the surface of the blade, within the shell of the blade, however not as embedded as the part extending below the dielectric washer 15.

In the embodiment shown, the dielectric washer 15 is circumscribing the entire circumference of the first lightning receptor 3. In an alternative embodiment, possibly only a limited part of the circumference of the first lightning receptor 3 is circumscribed by the dielectric washer 15, perhaps only the circumference of the lightning receptor 3, where the first section 16 of the electrical conductor 11 extends from the first lightning receptor 3.

Figure 4:
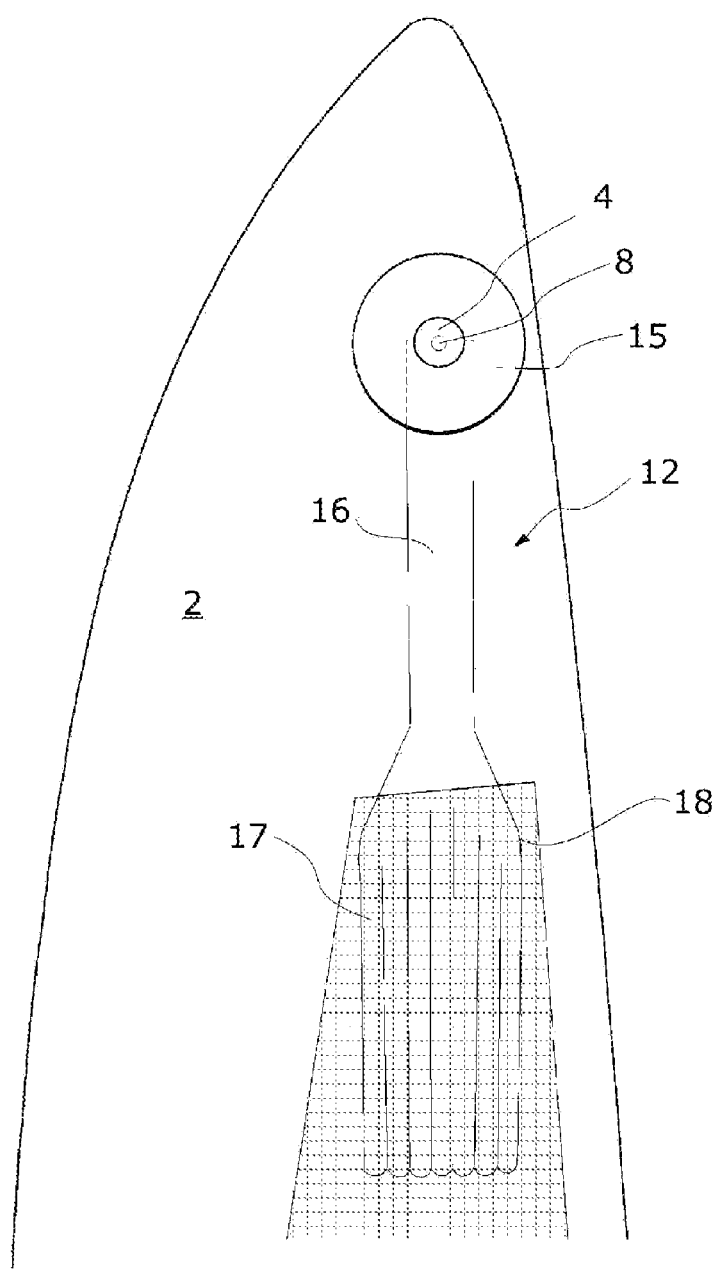
FIG. 4 is a sketch of the second lightning receptor, the dielectric washer and the electrical conductor when mounted in the blade, before a surface layer of the blade is applied.

FIG. 4 is a sketch showing another surface of a blade tip with a lightning protection system according to the invention installed. The surface of the blade is the wind-ward surface 2 when the blade is mounted on the wind turbine and when being in operation.

The second lightning receptor 4 is shown, and the head of the second bolt 8 securing the second lightning receptor 4 to the blade is shown. A dielectric washer 15, similar to the one on the lee-ward surface (see FIG. 3), is shown circumscribing the second lightning receptor 4.

A first section 16 of the electrical conductor 12 is in electrical communication with the second lightning receptor 4 along a second lightning receptor base (see FIG. 2), and a second section 17 of the electrical conductor 12 is in electrical communication with the electrically down-conducting element, which in the embodiment shown is a mesh of metal wires.

Part of the second section 16 of the electrical conductor 12 extends embedded further below the surface of the blade than the rest of the first section, said part being maintained further below the surface, within the shell of the blade, by means of the dielectric washer 15 circumscribing the second lightning receptor 4.

The remaining part of the electrical conductor 12, i.e. the rest of the first section 16, the intermediate section and the second section 17 also extend embedded below the surface of the blade, within the shell of the blade, however not as embedded as the part extending below the dielectric washer 15.

In the embodiment shown, the dielectric washer 15 is circumscribing the entire circumference of the second lightning receptor 4. In an alternative embodiment, possibly only a limited part of the circumference of the second lightning receptor 4 is circumscribed by the dielectric washer 15, perhaps only the circumference of the lightning receptor 4, where the first section 16 of the electrical conductor 12 extends from the second lightning receptor 4.

The following part of the description of the electrical conductor is common to both FIG. 3 and FIG. 4. The electrical conductor 11,12 consists in a first section 16 having a first width and being intended for electrical communication with the first lightning receptor base 5 or the second lightning receptor base 6, depending on which surface, i.e. the lee-ward surface 1 or the wind-ward surface 2, along which the electrical conductor 11,12 extends.

The electrical conductor 11,12 also has a second section 17 having a width being larger than the width of the first section 16 and being intended for electrical communication with the electrically down-conducting element 18 further down the blade. In the embodiment shown, the second section is divided into a plurality of individual strips by providing slots 17 along the second section of the electrical conductor.

The electrical conductor 11,12 extends from the first section 16 having the minor width to the second section 17 having the major width along an intermediate section. The extension of the electrical conductor from the first section, along the intermediate section to the second section takes place without any abrupt changes of the width of the electrical conductor 11,12, i.e. a smoothed transition of the width from the minor width of first section 16 to the major width of the second section 17.

Thereby, the risk of sparks occurring is minimised. Sparks often occur where a discontinuity appears in a conducting element. Even edges of the electrical conductor, both of the first section, the second section and the intermediate section, are rounded in order to not exhibit any abrupt and discontinuous changes along the change of width and along the change of planar configuration, i.e. from a single strip in the first section 16 to a plurality of strips in the second section 17. Thus, the risk of sparks occurring along or from the electrical conductor is minimized.

The invention claimed is:

1. A wind turbine rotor blade comprising a blade tip and a lightning protection system,
   said blade being at least partly made from a fibre-reinforced laminate,
   said lightning protection system including at least one metallic lightning receptor located at a surface of the blade, said at least one metallic lightning receptor positioned proximate to the distal end of the blade tip, and said blade comprising at least one electrically down-conducting element in the form of a metallic mesh, and
   at least one electrical conductor being provided for conducting an electrical current induced in the at least one metallic lightning receptor during a stroke of lightning, from the at least one metallic lightning receptor to the metallic mesh, where
   said at least one metallic lightning receptor at the surface of the blade is positioned in a first distance from the distal end of the blade tip, and
   said metallic mesh extending along a longitudinal axis of the blade from a second distance from the distal end of the tip of the blade and towards a root end of the blade,
   said second distance being larger than said first distance.

2. The wind turbine rotor blade according to claim 1, where said at least one metallic lightning receptor is supported in the surface of the blade, and where said lightning receptor is embedded in a dielectric washer, said dielectric washer at least partly circumscribing the lightning receptor along the surface of the blade.

3. The wind turbine rotor blade according to claim 2, where said lightning receptor is having a length extending from the surface of the blade and towards a central part of the blade, and said dielectric washer having a length extending from the surface of the blade and towards the central part of the blade, said length of the lightning receptor being larger than said length of the dielectric washer, and where at least a part of the electrical conductor is placed below a lower surface of the dielectric washer, and where the lightning receptor is connected to the electrical conductor, in order to force a stroke of lightning to travel from the lightning receptor to the electrical conductor.

4. The wind turbine rotor blade according to claim 2, where said dielectric washer is made of plastic.

5. The wind turbine rotor blade according to claim 2, where said first cross-section of the lightning receptor is having an outer circumference being circular, and said second cross-section of the dielectric washer is having an inner circumference corresponding to the outer circumference of the first cross-sectional area.

6. The wind turbine rotor blade according to claim 2, where said first cross-section of the lightning receptor is disc-shaped and said second cross-section of the dielectric washer is annular.

7. The wind turbine rotor blade according to claim 2, where said electrical conductor is constituted by a piece of metallic plate, said metallic plate having a first width in the surface of the blade along at least part of a first section arranged proximate to the blade tip and at the location of the lightning receptor, and said metallic plate having a second width in the surface of the blade along a second section arranged distant from the blade tip and at the position of the electrically down-conducting element, and said first width of the first section of the metallic plate being smaller than the second width of the second section of the metallic plate.

8. The wind turbine rotor blade according to claim 7, where at least a preliminary part of said first section of the metallic plate is extending from the lightning receptor and towards the second section on a lower surface of the dielectric washer in relation to the surface of the blade, and a remaining part of the metallic plate is extending on the surface of the blade towards the second section of the metallic plate at a position of the electrically down-conducting element.

9. The wind turbine rotor blade according to claim 1, where at least one first lightning receptor is provided in one surface of the blade and at least one second lightning receptor is provided in another and opposite surface of the blade, and said at least first lightning receptor and said at least second lightning receptor each being electrically communicating with an electrical conductor, one electrical conductor electrically communicating with the first lightning receptor and extending along the one surface of the blade and another electrical conductor electrically communicating with the second lightning receptor and extending along the other opposite surface of the blade.

10. The wind turbine rotor blade according to claim 9, where said at least first lightning receptor and said at least second lightning receptor are having a mutual electrical coupling, and said first lightning receptor and said second lightning receptor each electrically communicating with both the one and the other electrical conductor along the mutual electrical coupling.

11. The wind turbine rotor blade according to claim 1, where said blade at least in part is constituted by a wooden material, said blade also at least in part being constituted by carbon fibres, and where at least one fibre mesh of a metallic material is incorporated in the blade, preferably at the surface of the blade.

12. The wind turbine comprising wind turbine blades according to claim 1.

13. Method for manufacturing a wind turbine rotor blade comprising a blade tip and a lightning protection system, said method comprising the steps of
    providing a lightning protection system including at least one metallic lightning receptor at a surface of the blade,
    said at least one metallic lightning receptor being positioned proximate to the distal end of the blade tip,
    providing at least one electrically down-conducting element in the form of a metallic mesh, and
    providing at least one electrical conductor for conducting an electrical current induced in the at least one metallic lightning receptor during a stroke of lightning, from the at least one metallic lightning receptor to the metallic mesh, and
    positioning said at least one metallic lightning receptor at the surface of the blade in a first distance from the distal end of the blade tip, and
    positioning said metallic mesh to extend along a longitudinal axis of the blade from a second distance from the distal end of the tip of the blade and towards a root end of the blade, said second distance being larger than said first distance.

14. The method according to claim 13, the method further comprising the steps of:

manufacturing a blade body comprising a fibre-reinforced polymeric laminate, preferably comprising carbon-fibres, and possibly a wooden material, applying on the surface of or embedding in the surface of the blade electrically down-conducting element in the form of a metallic mesh, made wholly or partly of a metal material, said electrically down-conducting element being applied along a longitudinal axis of the blade and extending from a second distance from a distal end of the tip of the blade and towards a root end of the blade, applying on the surface of the blade or embedding in the surface of the blade, proximate to the tip of the blade, at least one lightning receptor, said lightning receptor being embedded in a dielectric washer of the blade, applying an electrical conductor to connect the lightning receptor to the electrically down-conducting element.

15. The method according to claim 13 further comprising the step of:

applying on the surface of or embedding in the surface of the blade a dielectric washer, said dielectric washer at least partly circumscribing the lightning receptor, and said dielectric washer having an extension from the lightning receptor along the surface of the blade, said extension of the dielectric washer providing an electrical insulation between the lightning receptor and the surface of the blade in any direction were the dielectric washer is circumscribing the lightning receptor.

16. The wind turbine rotor blade according to claim 4, where said dielectric washer is made of a polymeric resin.

17. The wind turbine rotor blade according to claim 4, where said dielectric washer is made of a fibre-reinforced plastic resin.

* * * * *